United States Patent [19]

Chiang et al.

[11] 3,867,511

[45] Feb. 18, 1975

[54] SOLVENT EXTRACTION OF $H_3PO_4$

[75] Inventors: Peter T. Chiang; John D. Nickerson, both of Atlanta, Ga.

[73] Assignee: United States Steel Corporation, Pittsburgh, Pa.

[22] Filed: Feb. 16, 1973

[21] Appl. No.: 333,084

Related U.S. Application Data

[63] Continuation-in-part of Ser. No. 316,937, Dec. 20, 1972, abandoned, which is a continuation of Ser. No. 129,075, March 29, 1971, abandoned.

[52] U.S. Cl.................. 423/321, 423/320, 423/555
[51] Int. Cl............................................ C01b 25/16
[58] Field of Search..................... 423/320, 321, 167

[56] References Cited
UNITED STATES PATENTS

| | | | |
|---|---|---|---|
| 1,929,443 | 10/1933 | Milligan | 423/321 |
| 3,298,782 | 1/1967 | Archambault | 423/321 |
| 3,415,619 | 12/1968 | Young | 423/321 |
| 3,595,613 | 7/1968 | Klingelhoefer | 423/321 |
| 3,723,606 | 3/1973 | Klingelhoefer et al. | 423/321 |

FOREIGN PATENTS OR APPLICATIONS

| | | | |
|---|---|---|---|
| 173,727 | 1934 | Switzerland | 423/321 |

*Primary Examiner*—O. R. Vertiz
*Assistant Examiner*—Eugene T. Wheelock
*Attorney, Agent, or Firm*—Arthur J. Greif

[57] ABSTRACT

Purified phosphoric acid is obtained from phosphate rock by digesting the rock with sulfuric acid, separating the resulting dilute phosphoric acid liquor and solubilized impurities from the calcium sulfate precipitate, concentrating the liquor to at least about 50% $P_2O_5$, extracting the phosphorus values from the concentrated liquor with n-hexanol, n-heptanol, n-octanol, iso-octanol, or a mixture thereof, and stripping the phosphoric acid values from the solvent liquor with water to recover purified phosphoric acid. The stripped solvent liquor is recycled to the extraction step. The amount of $P_2O_5$ values which are recovered from the impure liquor is substantially enhanced by employing at least two countercurrent extraction stages and at least three stripping stages, wherein about one-half of the raffinate from the first extraction stage is concentrated to match the $P_2O_5$ level of the aqueous stream from the last extraction stage and the two streams are admixed and fed to the immediately preceding extraction stage. The throughput rate of the system is significantly increased by maintaining the aqueous phase as the continuous phase in the last stripping stage, while the organic phase is maintained as the continuous phase in all the other extraction and stripping stages.

15 Claims, 4 Drawing Figures

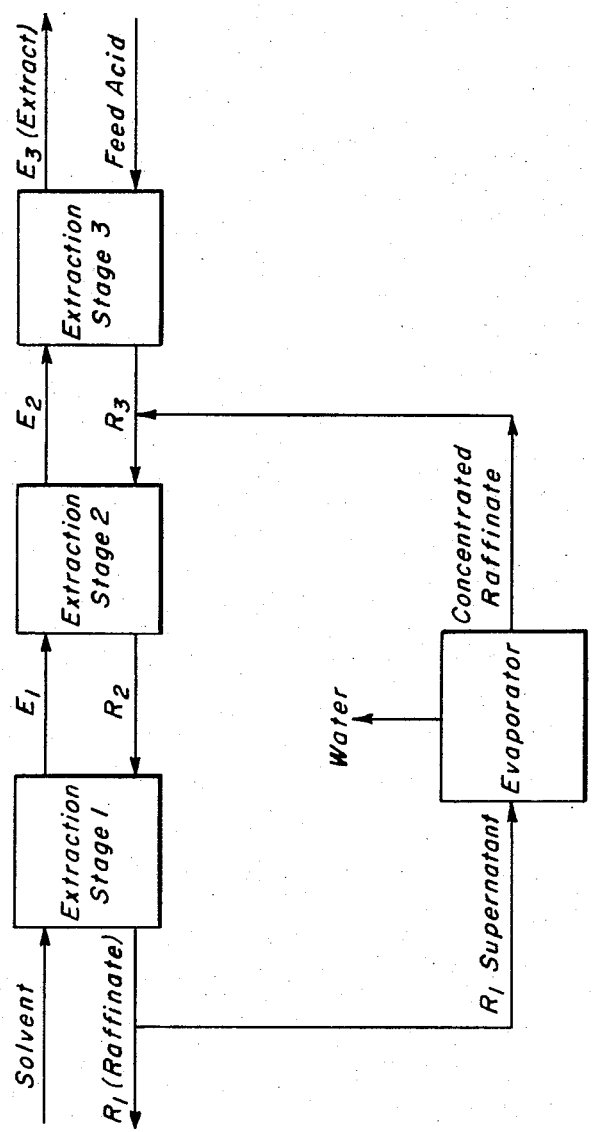
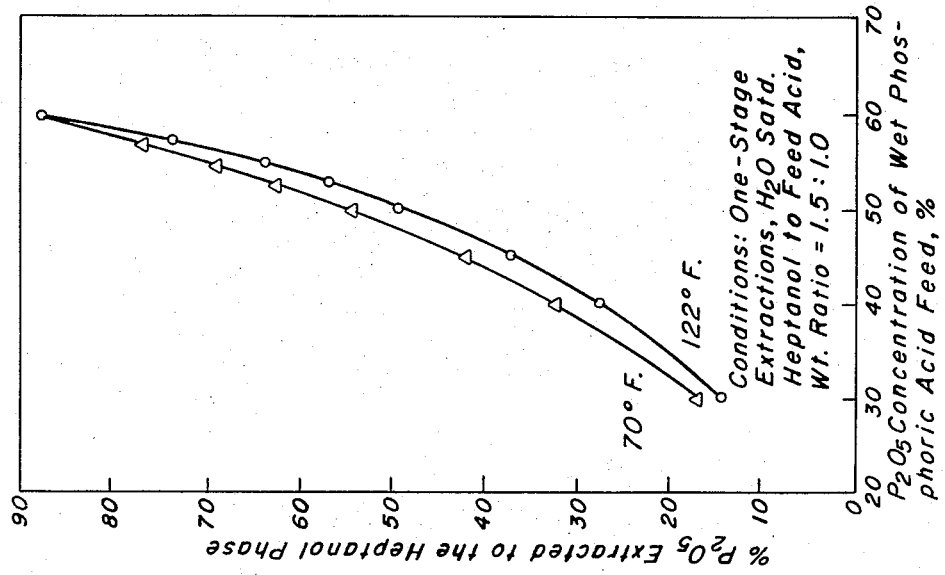

SOLVENT EXTRACTION OF $H_3PO_4$

This application is a continuation-in-part of application Ser. No. 316,937 now abandoned, filed Dec. 20, 1972 which in turn is a continuation of application Ser. No. 129,075, filed Mar. 29, 1971 and now abandoned.

BACKGROUND OF THE INVENTION

The diminishing quantity of high-grade phosphate rock reserves in the United States will ultimately result in production of wet-process phosphoric acid having higher impurity levels than those presently found. Increased sludging and other handling difficulties are presently existing problems and make it desirable to reduce the wet-acid iron, aluminum, and magnesium impurity levels. One method of reducing these impurity levels is through the solvent extraction of $P_2O_5$ values from the impurities.

The use of solvent extraction processes to purify wet-process phosphoric acid is not new. Three basic procedures have been suggested. The first procedure extracts $P_2O_5$ values from wet-process phosphoric acid into an appropriate organic solvent. The impurities rejected remain in the aqueous raffinate phase. In the second procedure, $P_2O_5$ values are extracted from mixtures of phosphoric acid and soluble chloride or nitrate salts which are introduced during the nitric or hydrochloric acid digestion of phosphate rock. Unlike the first two procedures, the third procedure extracts the impurities, rather than the $P_2O_5$ values, into the organic phase, usually by a solvent dissolved in a hydrocarbon such as kerosene. For various reasons, such as the use of expensive solvents, the necessity of heat transfer equipment, or the necessity of solvent recovery equipment, none of these processes has been widely commercialized.

Work was done on the purification of wet-process phosphoric acid in the 1920's by C. H. Milligan. In an early patent, U.S. Pat. No. 1,838,431, dated Dec. 29, 1931, Milligan claimed the use of an extraction solvent consisting predominantly of amyl alcohol to extract phosphoric acid from the liquor obtained from the sulfuric acid digestion of phosphate rock. The digestion liquor was not concentrated prior to being solvent extracted; thus, the $P_2O_5$ content of the feed acid to extraction was in the range of 30–32 weight percent. In his only example (2,84) Milligan, using fusel oil to extract and water to strip the extracted phosphoric acid from the solvent phase, is able to recover approximately 16 percent of the phosphoric acid present in the feed acid. This was a batch process using decantation as the separation technique. It should be noted that although Milligan designated amyl alcohol as the predominant species in his extractant, he also stated that other components, selected from the water-immiscible oxygenated hydrocarbon liquids not exceeding eight carbon atoms in the chain carrying the oxygen group (1,55), could be present.

In U.S. Pat. No. 1,857,470, Milligan et al., dated May 10, 1932, Milligan attempts to refine his process by using a two-component extraction liquid consisting predominantly of a water-immiscible monohydroxyl alcohol of not more than eight carbon atoms in the chain carrying the hydroxyl group and an aliphatic ester of an alcohol of not more than eight carbon atoms in the chain carrying the hydroxyl group. The preferred use of amyl alcohol is again disclosed (2,12); the feed acid is not concentrated and a batch process is used.

In U.S. Pat. No. 1,929,441, Milligan provides yet another extraction scheme. In claim 1, the extraction solvent consists primarily of an aliphatic monohydroxyl alcohol of from three to eight carbon atoms in the chain carrying the hydroxyl group. Water stripping is not contemplated, probably because of the miscibility of butyl alcohol, the preferred extraction alcohol, with the stripping water.

In the last of this series of patents, U.S. Pat. No. 1,929,442, Milligan combines the teachings of the previous patents. Materials containing inorganic phosphates are combined with sulfuric acid. The digestion liquor is then contacted with an extraction solvent consisting predominantly of a water-immiscible oxygenated hydrocarbon liquid of not more than eight carbon atoms in the chain carrying the oxygen group. The phosphoric acid-enriched extraction solvent is then contacted with water to strip the phosphoric acid from the extraction solvent. Milligan states that water-immiscible aliphatic alcohols of not more than eight carbon atoms to the molecule are eminently suitable for the practice of his process (2,93). Once again, it should be noted that this was a batch process, using unconcentrated phosphoric acid of about 30–32 weight percent $P_2O_5$ as feed. No statements as to yield or purity are made.

Cunningham, U.S. Pat. No. 2,885,265, dated June 21, 1955, described an improved solvent extraction process. Cunningham starts with a phosphate-containing material, calcines it, then digests the calcined material with sulfuric acid to produce calcium sulfate and orthophosphoric acid of not more than 40 weight percent phosphoric acid. The calcium sulfate-phosphoric acid slurry is treated in countercurrent fashion with a water-immiscible extraction solvent and, after separation of the phosphoric acid-enriched extraction solvent from the phosphoric acid-depleted aqueous phase, the extracted phosphoric acid is stripped from the extraction solvent by countercurrently contacting it with water. The extraction solvent may be an oxygenated hydrocarbon of low molecular weight, as for instance an alcohol of from three to eight carbon atoms in the hydroxyl group containing chain. N-butyl alcohol is preferred. The resultant aqueous phosphoric acid product also contains dissolved alcohol extractant which must be removed by a further extraction with a water-immiscible solvent for the alcohol, such as benzene.

Several deficiencies were present in these processes, as evidenced by the lack of commercial usage. These processes used unconcentrated wet-process acid either still in contact with the calcium sulfate slurry or direct from the filter. The use of liquors having such a low acid concentration resulted in extractive efficiencies in the range of 10 to 20 percent. Because so small an amount of the phosphoric acid was extracted per unit volume of extraction solvent, the use of large quantities of extraction solvent was necessary to obtain even this low efficiency (U.S. Pat. No. 1,929,442 at 2,105). All of the Milligan patents show a batch process. Cunningham takes the process a step further by making it continuous, but adds a step in the preparation of the phosphatic material that was not disclosed by Milligan — he calcines it. Cunningham found this added step necessary to prevent fouling of his solvent. He also adds a further step — the aqueous phosphoric acid stripped from the extraction solvent is contacted with benzene or other suitable aromatic hydrocarbon to remove the alcohol extractant which has dissolved in the aqueous acid. It then becomes necessary to strip the alcohol from the benzene — by distillation if it is desired to recycle both components, thus adding another process step.

Accordingly, the principal objects of this invention are 1) to provide a continuous countercurrent solvent extraction process where the solvent may be recycled with little or no secondary purification of the solvent being necessary, 2) to provide a process for the removal of at least one-half of the iron, aluminum, magnesium, and fluorine impurities present in wet-process phosphoric acid, 3) to provide a closed system wherein all phosphate values entering the system are recovered in a form suitable for conversion to fertilizer use, 4) to provide a system wherein at least 50 percent of the phosphate values entering the system are recovered in a purified form suitable for use in the manufacture of fluid fertilizers, 5) to provide an extraction and stripping process wherein the throughput rate of the system may be materially enhanced, and 6) to provide a method for materially increasing the recovery of $P_2O_5$ values in a two, three or four stage extraction process.

These and other objects and advantages of the instant invention will be more readily understood from the following description when taken in conjunction with the appended claims and the drawings, in which:

FIG. 1 is a graph of the extraction efficiency of 1-heptanol versus concentration of feed acid;

FIG. 4 is a schematic flow diagram illustrating a preferred embodiment for increasing $P_2O_5$ yield, by recycling a portion of the raffinate.

DETAILED DESCRIPTION

Figure 2:
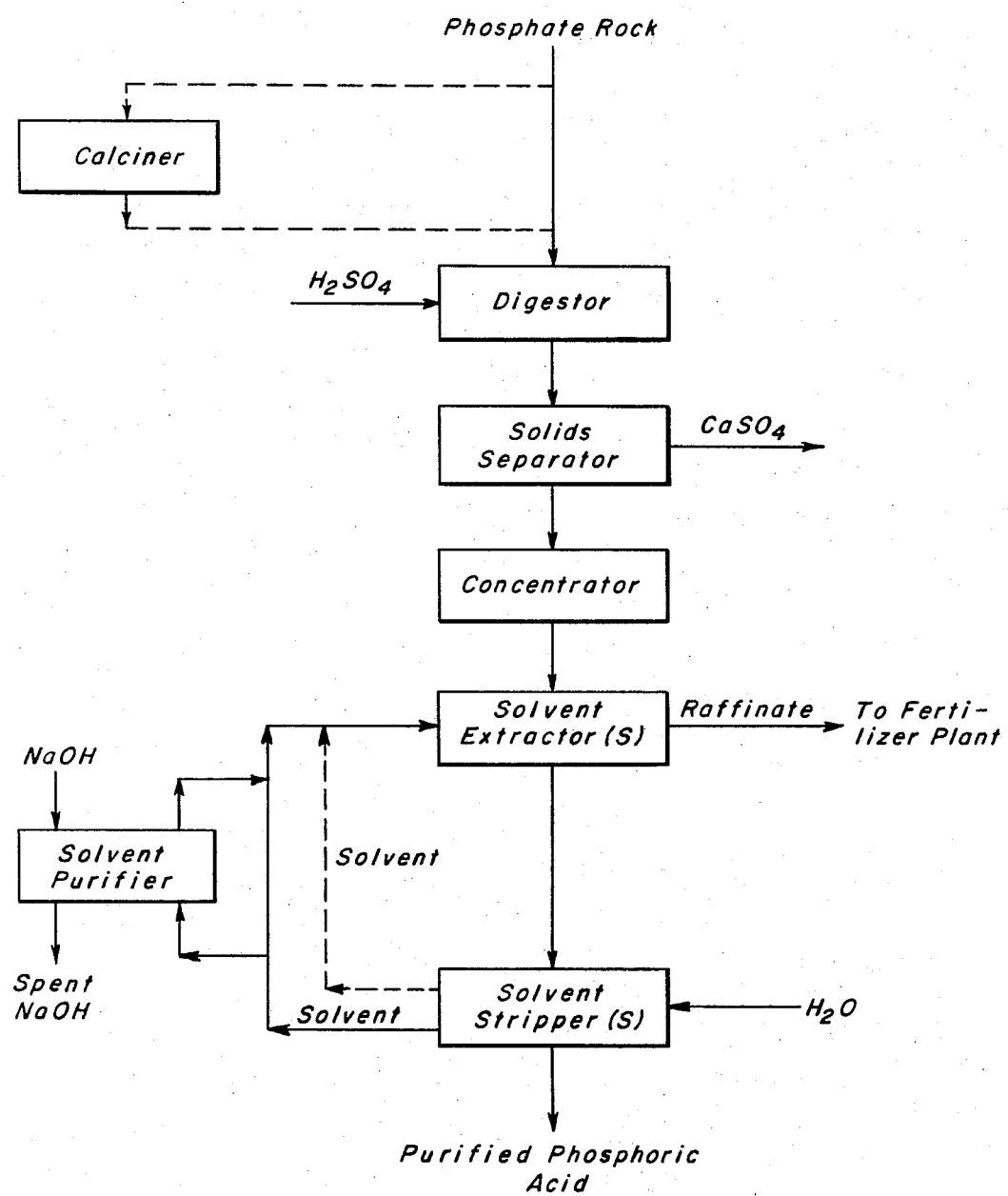
FIG. 2 is a schematic flow diagram of the basic process.

The production of phosphoric acid by the wet process involves the steps of 1) dissolving phosphate rock in a mixture of phosphoric acid and sulfuric acid, 2) holding the acidulated slurry until the calcium sulfate crystals have grown to adequate size, and 3) separating the acid and the calcium sulfate by filtration. In some instances, the rock is calcined before digestion. Wet-process acid from the filter normally contains 30–32 weight percent $P_2O_5$. The efficiency of solvent extraction processes using phosphoric acid feedstocks having such a $P_2O_5$ concentration is too low to make the process practical.

The practice of our process requires a feed acid having a minimum $P_2O_5$ concentration of about 50 weight percent. It is preferable to use an acid having a minimum $P_2O_5$ concentration of about 54 weight percent.

The solvents suitable for our process are n-hexanol, n-heptanol, n-octanol, iso-octanol, and mixtures thereof. Of these, n-heptanol is preferred on the basis of high extraction efficiency, low solubility in the aqueous phases, and low cost. The extraction efficiency of n-heptanol, calculated from the phase diagram of the system n-heptanol-$H_3PO_4$—$H_2O$, increases parabolically with the $P_2O_5$ concentration of the feed acid (FIG. 1). At 70°F, the calculated values show extraction of 17, 67 and 88 percent of the $P_2O_5$ from feed acid stocks containing 30, 54 and 60% $P_2O_5$, respectively. At 122°F, extraction is about 14, 62 and 88 percent of the $P_2O_5$ from feed acid stocks containing 30, 54 and 60% $P_2O_5$, respectively. Alcohols having fewer than six carbon atoms cannot be used because they are completely miscible with 54% $P_2O_5$ phosphoric acid. Alcohols having more than eight carbon atoms cannot be used because they provide low extraction efficiency and operational problems due to the formation of emulsions.

The solvent-to-acid weight ratio used in extraction may be varied within the range of about 4 to 1 and 1 to 2. It is preferable to operate in the range of about 3 to 1 to 1 to 1. Most preferable is a weight ratio of about 1.5 to 1. The preferred ratios are dictated by a balancing of two opposing effects. Thus, when the relative amount of solvent employed is decreased, the concentration of the final stripped product is increased. This is, of course, desirable. However, countering this effect, less of $P_2O_5$ values are extracted from the feed acid. Therefore, although $P_2O_5$ concentration of the final stripped product is greater, the total recovery of $P_2O_5$ values would be decreased. Additionally the solvent-to-acid ratio has a pronounced effect on the level of impurity rejection. For example, using n-heptanol as the solvent and a 55.7% $P_2O_5$ wet-process phosphoric acid, and holding the other variables constant while changing the solvent-to-acid weight ratio from 2 to 1 to 1 to 2, reduces the percentage of $P_2O_5$ extracted respectively, from 72 to 48 in a single-stage extraction. The corresponding impurity rejections decreased from 64 to 49 percent for Fe, 68 to 66 percent for Al, and 96 to 85 percent for Mg.

The extraction portion of our process is operable at temperatures ranging from 40° to 150°F, preferably 70° to 120°F. For acid prepared from uncalcined phosphate rock, it is preferred to maintain the extraction and stripping temperatures at about 120°F to increase the rate of phase separation.

The extract-to-water weight ratio used in stripping may be varied within the range of about 1 to 1 and 10 to 1 depending upon the number of stripping stages. That ratio should be chosen which will result in stripping about 90 percent of the $P_2O_5$ which is transferred from the extract phase to the aqueous phase. For 1, 2 or 3-stage stripping, the preferred ratios are about 2 to 1, 5.5 to 1, and 6.5–7.5 to 1 respectively.

The stripping portion of our process may similarly be operated at temperatures of from 40°–150°F, preferably 70°–120°F.

The stripping water should have a pH of 7 or below to prevent neutralization reactions from taking place. In a preferred embodiment of our process, the extract and water phases are mixed for a period of about 2 to 15 minutes, most preferably 5 to 10 minutes and then allowed to settle for a period of from about 60 to about 90 minutes.

One of the advantages of our process is its usefulness with phosphoric acid derived from either calcined or uncalcined rock. Phosphoric acid prepared from uncalcined phosphate rock (black acid) generally has an organic carbon content of from about 0.1 to about 0.6 percent, with an average of about 0.3 percent. The bulk of the organic impurities comes from the defoamer used in the digestion step. We have found that these tarry organic impurities are highly soluble in the solvents suitable to our process. During the extraction-stripping operation, the tar content in the recycle solvent increases rapidly to an intolerable level. The tar level in the recycle solvent should be prevented from rising to much over 15 weight percent; the process becoming inoperable when the tar level reaches about 25 to 35 weight percent. It is preferred to maintain the tar level below 10 weight percent. This problem is overcome by providing a small sidestream caustic purification or vacuum distillation step. In a preferred embodiment of our invention, the tar-like material which accumulates in the stripped solvent is allowed to build up to about a 10 percent tar level. A portion of the recycle solvent stream, ranging from about 3 to about 4 percent is directed to the solvent purification unit. Here, aqueous 50 percent caustic solution is diluted with water to 6 percent caustic and mixed with the contaminated solvent in a contaminated solvent-to-caustic ratio of from about 1 to 1.3 to about 1 to 1.7, preferably about 1 to 1.5. The resulting mixture is heated to from about 180° to about 230°F, preferably about 210°F, and held for a period of time sufficient to assure essentially complete transfer of the tar from the solvent phase to the aqueous phase. This transfer may take from 15 minutes to 1 hour. Generally, about 30 minutes is sufficient. Then, the mixture is allowed to overflow to a settling vessel in which it is retained for a period of time sufficient to assure essentially complete separation of the aqueous caustic and the solvent phases. The separation may take from 30 minutes to two hours. Generally, one hour is sufficient. The settling vessel is maintained at a temperature of from about 150° to about 200°F, preferably about 175°F, to increase the rate of phase separation. The top phase in the settler, containing purified solvent, is recycled to the extraction step. The bottom aqueous phase containing the tar, spent caustic, and a small quantity of $P_2O_5$ is mixed with the raffinate product, thus assuring complete recovery of the phosphate entering the system.

The full benefits of the instant invention will be realized by operating at least two stages of countercurrent extraction and at least two stages of countercurrent stripping. It is preferable to employ three stages in both the extraction and stripping systems.

Figure 3:
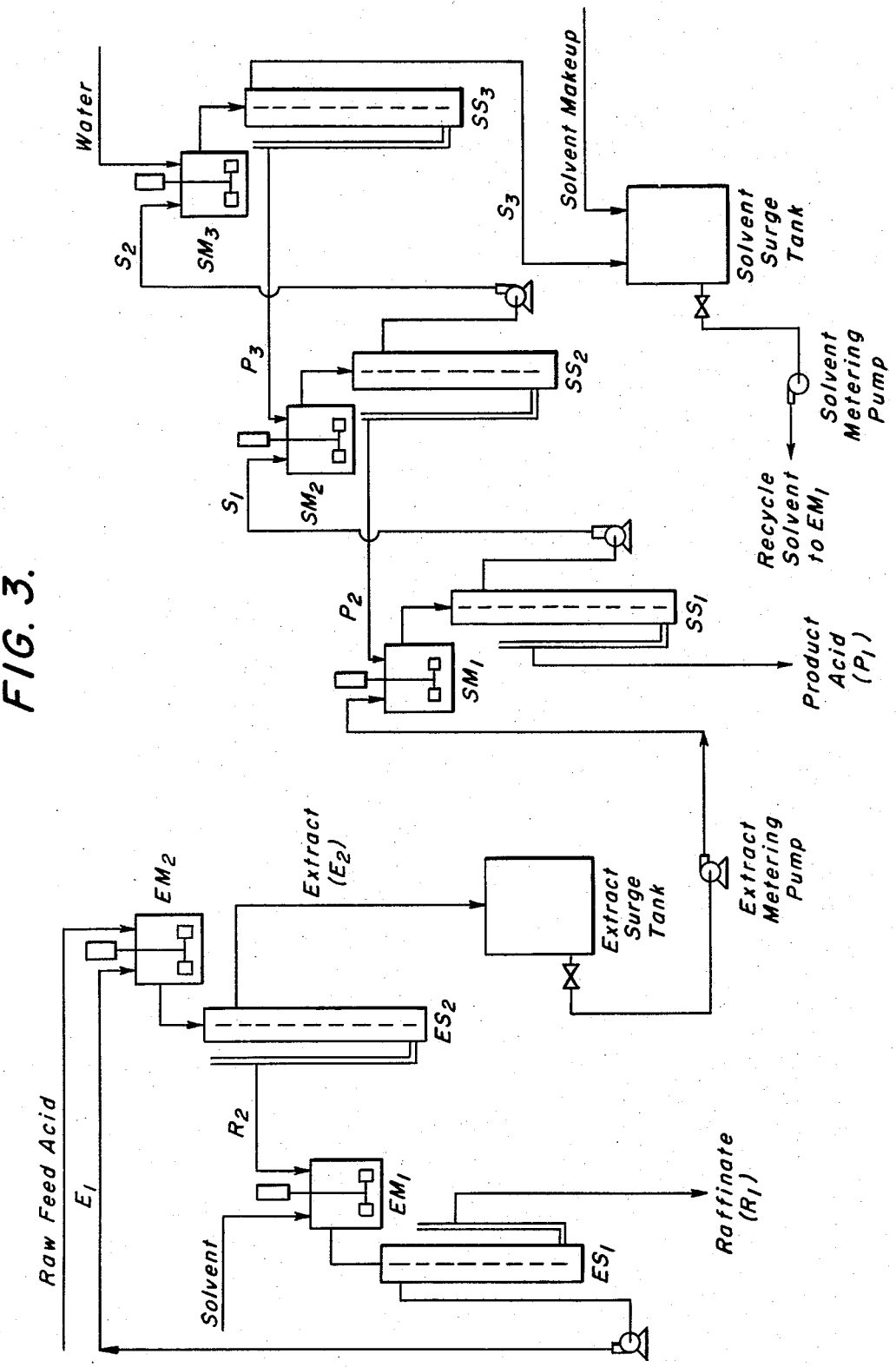
FIG. 3 shows a two-stage countercurrent extraction and three-stage countercurrent stripping operation.

With reference to FIGS. 2 and 3, the system is operated as follows:

FIG. 3 shows a system employing 2 stages of countercurrent extraction and 3 stages of countercurrent stripping. The procedures employed for additional extraction stages and/or only 2 stages of stripping would be substantially the same. In the extraction section, concentrated impure phosphoric acid is fed to the second-stage extraction mixer $EM_2$, and solvent fed to the first-stage extraction mixer $EM_1$. Countercurrent flow is used, with the direction of solvent flow from stage one to stage two, and the acid flow from stage two to stage one. The solvent is mixed with the partially extracted acid under flow $R_2$ leaving the second-stage extraction settler $ES_2$. In the mixer, phosphoric acid is extracted from the aqueous phase to the solvent phase until the two phases are in equilibrium. The aqueous phase leaving $ES_1$ (raffinate $R_1$) contains roughly 60–80 percent of the impurities present in the feed acid, but only 20–30 percent of the $P_2O_5$. The organic stream $E_1$ with a $P_2O_5$ concentration of 8–10 percent, after overflowing from the first-stage extraction settler $ES_1$, is pumped to the second-stage extraction mixer $EM_2$ and contacted with the incoming feed acid. Phosphoric acid is transferred to the solvent phase, raising the $P_2O_5$ concentration of the solvent phase $E_2$, e.g. to 20–25 percent. The relative amounts of organic phase and aqueous phase in a settler are controlled by the height of the underflow leg leaving the settler. The higher the underflow leg, the more of the higher density layer (aqueous phase) is required in the settler to balance the head due to the heavy liquid in the underflow leg. The $P_2O_5$-loaded extract $E_2$ is fed to the stripping section from the extract surge tank.

In the stripping section, the extract is contacted with dilute aqueous phosphoric acid $P_2$ in the first-stage stripping mixer $SM_1$. Part of the phosphoric acid is transferred from the solvent phase to the aqueous phase during mixing. The two-phase mixture overflows from the mixer to the first-stage stripping settler $SS_1$, where the phases separate. The aqueous phase leaving the bottom of the settler is the purified phosphoric acid product, generally containing 42–45 percent $P_2O_5$. The partially stripped solvent phase $S_1$ leaving the settler overflow will usually contain about 15–17 percent $P_2O_5$, and is pumped to the second-stage stripping mixer $SM_2$ for further stripping. Weak phosphoric acid $P_3$ is mixed with $S_1$ in $SM_2$, transferring additional phosphoric acid from the solvent phase to the aqueous phase. The two-phase mixture overflows from the mixer to the second-stage stripping settler $SS_2$, where the phases separate. The aqueous phase $P_2$ leaving the bottom of the settler flows by gravity to the first-stage stripping mixer $SM_1$, and the solvent phase $S_2$, normally containing 10–12 percent $P_2O_5$, is pumped to the third-stage stripping mixer $SM_3$ for final stripping. Water is metered to $SM_3$, where most of the phosphoric acid remaining in the solvent phase is transferred to the aqueous phase. The phases are separated in the third-stage stripping settler $SS_3$, with aqueous phase leaving the bottom and flowing by gravity to $SM_2$. The stripped solvent, containing, for example, about 3–5% $P_2O_5$, overflows from $SS_3$ by gravity to the solvent surge tank where it is recycled back to the extraction section. If necessary, a small side stream of the recycle solvent is drawn off to be purified (see FIG. 2) by vacuum distillation or by treatment with caustic soda in the solvent purification circuit. Fresh solvent is added periodically to the solvent surge tank to replace solvent lost to the purified acid and raffinate streams, and by mechanical malfunctions.

The countercurrent procedure described above is somewhat similar to that shown by Ramaradhya U.S. Pat. No. 3,388,967 (the actual solvents employed are substantially different). However, this patent is silent as to which phase (organic or aqueous) is maintained as the continuous phase in the various stages employed. In an organic liquid-aqueous liquid phase system, mixing can lead to either a dispersion of the organic droplets in an aqueous phase (continuous aqueous) or to a dispersion of the aqueous droplets in an organic phase (continuous organic). Among the factors which determine which phase will be continuous are (1) the position of the agitator relative to each phase before stirring, i.e., the phase in which stirring is initiated will tend to be continuous, and (2) the relative volumes of each phase. Because of the preferred solvent-to-acid and extract-to-water ratios employed in the instant process, the volume of the organic phase is significantly larger than that of the aqueous phase in all the extraction and stripping stages; thus the system has a natural tendency to form continuous organic phases. It has now been discovered that the coalescence rate of the final stripping stage settler (i.e. $SS_3$ in FIG. 3) is significantly enhanced, and the tendency to form emulsions eliminated, by maintaining the aqueous phase as the continuous phase therein. This may be achieved, for example, by recycling to the mixer a portion of the aqueous underflow from the settler, thus altering the relative volumes of the aqueous and organic phases. In actual operation employing a green acid feed, a four-fold increase in coalescence rate was achieved, when employing this feature. This phenomena appears to be a peculiar property of the instant solvents, at this particular stage, since the coalescence rate at the other stages (both extraction and stripping) is only very slightly affected by changing from an organic continuous to an aqueous continuous system. Coalescence rates were also enhanced by employing a similar procedure for black acid feeds. However, the increase was not as great since the normal coalescence rate for the latter acid feed is only about one-fourth the rate of a green acid feed. This difference is primarily caused by the organic matter present in the black acid.

FIG. 4 illustrates a further embodiment for increasing the total amount of $P_2O_5$ which may be extracted. Even after three stages of extraction, the raffinate stream $R_1$, will generally contain from about 20 to 30 percent the $P_2O_5$ values which were present in the feed acid. If the $R_1$ stream were not utilized (i.e. as in U.S. Pat. No. 3,388,967) there would result in a significant loss of $P_2O_5$ for the production of purified product. One obvious method for recovering a portion of this extra $P_2O_5$ in purified form would be to add a fourth extraction stage, but utilization of such an additional stage in the instant process only increased the yield by about 4 percentage units. It has been found, however, that if about one-third to two-third (preferably about one-half) of this raffinate stream is concentrated (e.g. to about 46% $P_2O_5$) so as to match the concentration of the $R_3$ stream, and the combined streams are passed to the preceding extraction stage, an increase in yield of 7–14 percentage units is achieved. When employing such a procedure in the instant process, it is essential that the raffinate, after concentration, be combined with the aqueous stream exiting from the last extraction stage (e.g., for a three-stage extraction system, $R_3$ in FIG. 4). Otherwise, the improvement in yield would be significantly less.

The following specific examples will serve to further illustrate both the general features, as well as the preferred embodiments of the invention.

EXAMPLE 1

306 g wet-process phosphoric acid containing 50.0% $P_2O_5$, obtained by acidulation of uncalcined Florida phosphate rock with sulfuric acid, was stirred with 306 g anhydrous n-heptanol for 30 minutes at ambient temperature. The mixture was allowed to settle for one hour into two liquid phases. The aqueous bottom phase (raffinate) weighed 165 g and contained 46.2% $P_2O_5$, as well as most of the impurities of the original feed acid (Table I). The organic phase (extract), amounting to 444 g, contained 17.1% $P_2O_5$, which corresponded to 50 percent of the original $P_2O_5$ subjected to extraction. The extract was stirred with 222 g water for 30 minutes, and the phase separation carried out in the same manner as above. The aqueous bottom phase (purified acid) weighed 336 g and contained 21.9% $P_2O_5$. The stripped solvent, amounting to 327 g, contained 1.75% $P_2O_5$ and was ready for recycle to the extraction stage.

TABLE I

| Example 1 | Analyses, wt. % | | | | |
|---|---|---|---|---|---|
| | $P_2O_5$ | $Fe_2O_3$ | $Al_2O_3$ | MgO | F |
| Feed Acid | 50.0 | 1.07 | 1.18 | 0.28 | 1.00 |
| Purified Acid | 21.9 | 0.19 | 0.09 | 0.012 | 0.18 |
| Raffinate | 46.2 | 1.86 | 1.79 | 0.48 | 1.39 |
| Impurity Rejection (%)* | — | 60 | 83 | 90 | 59 |

EXAMPLE 2

305 g wet-process phosphoric acid containing 55.5% $P_2O_5$, obtained by acidulation of uncalcined Florida phosphate rock with sulfuric acid, was stirred with 305 g anhydrous n-heptanol for 30 minutes at ambient temperature. The mixture was allowed to settle for one hour, and separated into two phases. The raffinate weighed 110 g and contained 45.4% $P_2O_5$, as well as most of the impurities of the original wet acid (Table II). The extract, amounting to 496 g, contained 23.0% $P_2O_5$, which corresponds to 70 percent of the original $P_2O_5$ subjected to extraction. The extract was stirred with 248 g water for 30 minutes, and the phase separation carried out as before. The purified acid weighed 410 g and contained 25.6% $P_2O_5$. The stripped solvent, amounting to 330 g, contained 2.7% $P_2O_5$.

TABLE II

| Example 2 | Analyses, wt. percent | | | | |
|---|---|---|---|---|---|
| | $P_2O_5$ | $Fe_2O_3$ | $Al_2O_3$ | MgO | F |
| Feed acid | 55.5 | 1.56 | 1.01 | 0.50 | 1.25 |
| Purified acid | 25.6 | 0.40 | 0.15 | 0.06 | 0.16 |
| Raffinate | 45.4 | 2.14 | 2.01 | 1.12 | 1.91 |
| Impurity rejection (percent)* | | 44 | 68 | 74 | 72 |

*Impurity rejection (percent) =

$$\frac{\text{Impurity}/P_2O_5 \text{(feed acid)} - \text{impurity}/P_2O_5 \text{(purified acid)}}{\text{Impurity}/P_2O_5 \text{(feed acid)}} \times 100$$

EXAMPLE 3

The same type of wet acid but with higher iron and aluminum content than the one used in Example 2 was extracted with $H_2O$-saturated n-heptanol at three different solvent-to-acid ratios of 400 g/200 g, 300 g/300 g, and 200 g/400 g. The same procedure as in Example 2 was used. The weights, $P_2O_5$ content, and impurity content are given in Table III.

The purified acid weighed 430 g and contained 24.2% $P_2O_5$. The stripped solvent, amounting to 357 g, contained 2.2% $P_2O_5$.

Table V

| Example 5 | $P_2O_5$ | $Fe_2O_3$ | $Al_2O_3$ | MgO | F | n-Hexanol | n-Octanol | Iso-Octanol |
|---|---|---|---|---|---|---|---|---|
| Feed Acid | 54.0 | 1.44 | 0.57 | 1.06 | 0.62 | — | — | — |
| Purified Acid | 23.5 | 0.24 | 0.03 | 0.05 | 0.07 | — | 0.023 | 0.010 |
| Raffinate | 46.8 | 2.17 | 0.87 | 1.72 | 0.83 | — | 0.17 | 0.15 |
| Impurity Rejection (%) | — | 62 | 88 | 89 | 74 | — | — | — |

EXAMPLE 5

350 g of the same feed acid used in Example 4 was

TABLE III

| Material | Solvent/Acid Wt. Ratio | Weight g | $P_2O_5$ | $Fe_2O_3$ | $Al_2O_3$ | MgO |
|---|---|---|---|---|---|---|
| Example 3 | | | | | | |
| Heptanol | 2:1 | 400 | — | — | — | — |
| Feed Acid | | 200 | 55.6 | 2.65 | 1.25 | 0.15 |
| Extract | | 521 | 15.3 | 0.26 | 0.11 | 0.001 |
| Raffinate | | 77 | 41.3 | 4.56 | 2.58 | 0.30 |
| Impurity Rejection (%) | | — | — | 64 | 68 | 96 |
| Heptanol | 1:1 | 300 | — | — | — | — |
| Feed Acid | | 300 | 55.6 | 2.65 | 1.25 | 0.15 |
| Extract | | 465 | 22.7 | 0.43 | 0.17 | 0.005 |
| Raffinate | | 133 | 46.6 | 3.50 | 2.20 | 0.17 |
| Impurity Rejection (%) | | — | — | 60 | 67 | 86 |
| Heptanol | 1:2 | 200 | — | — | — | — |
| Feed Acid | | 400 | 55.6 | 2.65 | 1.25 | 0.15 |
| Extract | | 370 | 29.0 | 0.70 | 0.22 | 0.007 |
| Raffinate | | 229 | 50.9 | 3.26 | 1.52 | 0.15 |
| Impurity Rejection (%) | | — | — | 49 | 66 | 85 |

EXAMPLE 4

350 g wet-process phosphoric acid containing 54.0% $P_2O_5$, obtained by acidulation of calcined North Carolina phosphate rock with sulfuric acid, was stirred with a mixed solvent containing 88 g $H_2O$-saturated n-hexanol and 262 g $H_2O$-saturated n-octanol for one hour at ambient temperature. The mixture was allowed to settle for two hours into two liquid phases. The raffinate weighed 172 g and contained 45.2% $P_2O_5$, as well as most of the impurities of the original feed acid (Table IV). The extract, amounting to 526 g, contained 21.0% $P_2O_5$, which corresponded to 58 percent of the original $P_2O_5$ subjected to extraction. The extract was stirred with 263 g water for one hour, and the phase separation carried out in the same manner as above.

extracted with a mixed solvent containing 175 g $H_2O$-saturated n-octanol and 175 g $H_2O$-saturated iso-octanol at ambient temperature. The same procedure described in Example 4 was followed. The raffinate weighed 196 g and contained 46.8% $P_2O_5$, as well as most of the impurities of the original feed acid (Table V). The extract, amounting to 502 g, contained 19.7% $P_2O_5$, which corresponded to 52 percent of the original $P_2O_5$ subjected to extraction. The extract was stirred with 251 g water, using the same procedure as in Example 4. After separation, the purified acid weighed 398 g and contained 23.5% $P_2O_5$, whereas the stripped solvent, amounting to 353 g, contained 1.5% $P_2O_5$.

TABLE IV

| Example 4 | $P_2O_5$ | $Fe_2O_3$ | $Al_2O_3$ | F | n-Hexanol | MgO | n-Octanol | Iso-Octanol |
|---|---|---|---|---|---|---|---|---|
| Feed Acid | 54.0 | 1.44 | 0.57 | 1.06 | 0.62 | — | — | — |
| Purified Acid | 24.2 | 0.32 | 0.05 | 0.09 | 0.10 | 0.063 | 0.039 | — |
| Raffinate | 45.2 | 2.21 | 0.92 | 1.81 | 0.91 | 0.19 | 0.53 | — |
| Impurity Rejection (%) | — | 50 | 80 | 81 | 64 | — | — | — |

The following two examples (6 and 7) demonstrate the decided advantage of maintaining the aqueous phase as the continuous phase in the last stripping stage.

EXAMPLE 6

A three hour continuous extraction-stripping operation was performed at ambient temperature, using laboratory threestage extraction and three-stage stripping, mixer-settler equipment. Idaho green wet-process phosphoric acid containing 52.8% $P_2O_5$, made from calcined rock, was used as feed (33 ml./min.) and n-heptanol was used as solvent (91 ml. recycle solvent/min.). The average flow rates (ml./min.) for the other two terminal streams were: raffinate — 15.7, stripping water — 18. The organic phase was maintained as the continuous phase at all six stages and the coalescence rate was approximately 0.9 GPM/ft.$^2$ in every settler. It was found that the organic overflow (solvent to recycle) from stripping stage 3 settler contained about 8 vol. % entrained aqueous phase. A parallel run was carried out under the same conditions except that a part of the aqueous phase was recycled (85 ml./min.) from the stripping stage 3 settler to the stripping stage 3 mixer to maintain an aqueous continuous phase there. In this manner, the coalescence rate in the stripping stage 3 settler was increased from 0.9 to 3.6 GPM/ft.$^2$, and at the same time the entrainment in the overflow was reduced from 8.0 to 0.2 vol. %. The listed increase in coalescence rate is adjusted to include the additional flow of the recycle stream.

EXAMPLE 7

In an operation using the same equipment, but with a black acid feed, the coalescence rates for the first five continuous organic stages were 0.21 GPM/ft.$^2$, i.e. about one-fourth that the green acid of Example 6. A twelve hour continuous extraction-stripping operation was conducted using recycle n-heptanol containing 7 percent tar as solvent and Florida black wet-process acid (containing 51.7% $P_2O_5$, 1.33% $Fe_2O_3$, 1.81% $Al_2O_3$, 0.42% MgO and 2.2% F) made from uncalcined rock as feed acid. The average flow rates (ml./min.) for the terminal streams were: solvent — 36.5, feed acid — 12, stripping water — 7.2, purified acid — 12.8, raffinate 4.9, and the flow rate for the $P_3$ recycle stream was 39 ml./min. When the third stripping stage was operated with the aqueous phase as the continuous phase, the coalescence rate of this stage was substantially doubled. During the 12 hour period, 5.58 kg. raffinate containing 32.8% $P_2O_5$, 2.14% $Fe_2O_3$, 4.97% $Al_2O_3$, 0.96% MgO, and 4.5% F, and 13.6 kg. purified acid (77 percent yield) containing 42.5% $P_2O_5$, 0.63% $Fe_2O_3$, 0.45% $Al_2O_3$, 0.058% MgO, and 0.40% F were collected, with the consumptions of 15.2 kg. of feed acid and 5.25 kg. of stripping water. It may therefore be seen, that for a plant of given capacity, the throughput rate may be materially increased by proper adjustment of the continuous phase in the last stripping stage. For a green acid feed, throughput may be quadrupled, while for a black acid feed this rate is about doubled.

EXAMPLE 8

This example is provided to illustrate the increase in yield which may be achieved in utilizing the raffinate recycle embodiment (FIG. 4) of our invention. A 6 hour continuous extraction-stripping operation was conducted at ambient temperature, using the three stage extraction-three stage stripping equipment. Idaho green wet-process phosphoric acid containing 52.8% $P_2O_5$, 0.82% $Fe_2O_3$, 1.47% $Al_2O_3$, 0.84% MgO, and 0.80% F was used as feed (21.5 ml./min.) and n-heptanol used as solvent (63.7 ml. recycle solvent/min.). The average flow rates (ml./min.) for some of the other streams were: raffinate to storage —5.7, raffinate to evaporator — 5.6, raffinate leaving evaporator (46.1% $P_2O_5$) — 3.8, stripping water — 11.4. During the six hour period, 3.24 kg. (net) raffinate containing 36.0% $P_2O_5$, 1.58% $Fe_2O_3$, 4.40% $Al_2O_3$, 2.42% MgO, and 1.87% F, and 12.5 kg. purified acid (83 percent yield) containing 42.9% $P_2O_5$, 0.22% $Fe_2O_3$, 0.27% $Al_2O_3$, 0.11% MgO, and 0.15% F were collected with the consumptions of 12.85 kg. of feed acid and 4.12 kg. of stripping water. The purified acid (72 percent yield) obtained under the same conditions but without the raffinate recycle contains 42.0% $P_2O_5$, 0.19% $Fe_2O_3$, 0.24% $Al_2O_3$, 0.09% MgO, and 0.12% F.

We claim:

1. A process for the removal of iron, aluminum, magnesium and fluorine impurities from wet-process phosphoric acid comprising:

a. digesting phosphate rock with sulfuric acid to form a slurry comprising phosphoric acid, calcium sulfate, and sulfuric acid;

b. separating the slurry into solid and aqueous liquid portions;

c. concentrating the aqueous liquid portion until it contains at least 50 weight percent phosphate, calculated as $P_2O_5$;

d. passing said concentrated aqueous liquid portion to a solvent extraction system employing from two to four stages of countercurrent extraction, wherein said solvent is an essentially water-immiscible alcohol selected from the group consisting of n-hexanol, n-heptanol, n-octanol, iso-octanol and mixtures thereof, said solvent being employed in a ratio of about one-half to about four parts by weight for each part of said concentrated aqueous liquid portion;

e. obtaining a phosphoric acid rich solvent extract and a raffinate by-product and passing said extract to a water stripping system employing from two to four stages of countercurrent stripping, said extract being employed in a ratio of about 1 to 10 parts by weight of extract for each part of stripping water, whereby about 90 percent of the phosphate in the solvent phase is transferred to the aqueous phase;

f. maintaining the solvent phase as the continuous phase in all the extraction stages and in all but the last of said stripping stages, while maintaining the aqueous phase as the continuous phase in the last water stripping stage;

g. recycling the water stripped solvent from the last stripping stage of step e) to the first extraction stage of step d) and recovering purified phosphoric acid from the first stripping stage.

2. The process of claim 1, wherein three stages are employed in said extraction system and three stages are employed in said stripping system.

3. The process of claim 2, wherein said process of extraction and stripping are conducted at temperatures between 40° and 150°F.

4. The process of claim 3, wherein said temperatures are between 70° and 120°F.

5. The process of claim 2, wherein the ratio of the solvent to said aqueous liquid portion in step d) is from about 1 to 3 to 1.

6. The process of claim 5, wherein the ratio of the extract to said stripping water in step e) is from about 6.5 to 7.5 to 1.

7. The process of claim 6, wherein the phosphate rock is calcined prior to digestion with $H_2SO_4$.

8. The process of claim 5, wherein said aqueous liquid portion from step b) is concentrated to at least 54% $P_2O_5$.

9. The process of claim 1, wherein the yield of $P_2O_5$ in the final purified product is materially enhanced by
  i. feeding a portion of said raffinate by-product to an evaporator and increasing the $P_2O_5$ concentrations thereof to a $P_2O_5$ level approximately that of the aqueous stream exiting from the last extraction stage, said portion amounting to from one-third to two-third of said raffinate by-product, and thereafter
  ii. combining said concentrated raffinate portion with said last stage aqueous stream and passing the combined stream to the preceding extraction stage.

10. The process of claim 9, wherein three stages are employed in said extraction system and three stages are employed in said stripping system.

11. The process of claim 10, wherein said portion is about one-half of said raffinate product.

12. The process of claim 1, wherein a minor portion of said water stripped solvent from step e) is purified prior to being recycled to step d), said purification being conducted to maintain the organic impurity level in the solvent from rising above 15 weight percent.

13. The process of claim 12, wherein said minor portion is in the range of from about 3 to 4 percent of the water stripped solvent being recycled.

14. The process of claim 2, wherein said solvent is n-heptanol.

15. The process of claim 8, wherein said solvent is n-heptanol.

* * * * *

UNITED STATES PATENT OFFICE
CERTIFICATE OF CORRECTION

Patent No. 3,867,511   Dated February 18, 1975

Inventor(s) Peter T. Chiang et al.

It is certified that error appears in the above-identified patent and that said Letters Patent are hereby corrected as shown below:

In Table IV, the column headed "F" should be -- MgO --;

the column headed "n-Hexanol" should be -- F --.

the column headed "MgO" should be -- n-Hexanol --;

Signed and Sealed this twenty-sixth Day of August 1975

[SEAL]

Attest:

RUTH C. MASON
Attesting Officer

C. MARSHALL DANN
Commissioner of Patents and Trademarks